(12) United States Patent
Golgiri et al.

(10) Patent No.: US 11,148,489 B2
(45) Date of Patent: *Oct. 19, 2021

(54) HITCH ASSIST SYSTEM

(71) Applicant: Ford Global Technologies, LLC, Dearborn, MI (US)

(72) Inventors: Hamid M. Golgiri, Livonia, MI (US); Luke Niewiadomski, Dearborn, MI (US); Erick Michael Lavoie, Dearborn, MI (US); Roger Arnold Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 448 days.

This patent is subject to a terminal disclaimer.

(21) Appl. No.: 16/155,009

(22) Filed: Oct. 9, 2018

(65) Prior Publication Data

US 2020/0108679 A1    Apr. 9, 2020

(51) Int. Cl.
| | |
|---|---|
| *B60D 1/36* | (2006.01) |
| *B60W 30/18* | (2012.01) |
| *B60W 30/09* | (2012.01) |
| *B60D 1/26* | (2006.01) |
| *B60W 50/08* | (2020.01) |
| *B60D 1/06* | (2006.01) |

(52) U.S. Cl.
CPC ............... *B60D 1/36* (2013.01); *B60D 1/26* (2013.01); *B60W 30/09* (2013.01); *B60W 30/18036* (2013.01); *B60W 50/08* (2013.01); *B60D 1/06* (2013.01); *B60W 2554/00* (2020.02)

(58) Field of Classification Search
CPC .......... B60D 1/26; B60D 1/36; B60W 30/09; B60W 30/18036; B60W 50/08
USPC ............................................. 701/2
See application file for complete search history.

(56) References Cited

U.S. PATENT DOCUMENTS

| | | | | |
|---|---|---|---|---|
| 4,570,217 | A * | 2/1986 | Allen ................... | G06F 9/4881 |
| | | | | 700/83 |
| 6,100,795 | A | 8/2000 | Otterbacher et al. | |
| 6,634,666 | B2 | 10/2003 | Shilitz et al. | |
| 7,777,615 | B2 * | 8/2010 | Okuda ..................... | B60D 1/36 |
| | | | | 340/431 |
| 9,102,271 | B2 | 8/2015 | Trombley et al. | |
| 9,352,777 | B2 | 5/2016 | Lavoie et al. | |
| 10,150,505 | B2 * | 12/2018 | Herzog ............. | G06K 9/00791 |
| 10,351,061 | B1 * | 7/2019 | Chaudhari ............... | B60D 1/36 |
| 2014/0012465 | A1 | 1/2014 | Shank et al. | |
| 2015/0115571 | A1 * | 4/2015 | Zhang ................... | H04N 7/183 |
| | | | | 280/477 |
| 2015/0197278 | A1 * | 7/2015 | Boos .................. | B62D 15/0285 |
| | | | | 701/2 |

(Continued)

FOREIGN PATENT DOCUMENTS

CA         2380502 A1    6/2008

*Primary Examiner* — Isaac G Smith
(74) *Attorney, Agent, or Firm* — Raymond Coppiellie; Price Heneveld LLP

(57) ABSTRACT

A hitch assist system is provided herein. The hitch assist system includes a mobile device remotely disposed from a vehicle and configured to receive a user input for adjusting an alignment position of a hitch assembly of a vehicle. A controller is configured to generate commands for maneuvering the vehicle such that the hitch assembly is moved to an adjusted position at which the hitch assembly is aligned with a coupler of a trailer.

14 Claims, 11 Drawing Sheets

(56) References Cited

U.S. PATENT DOCUMENTS

2016/0304122 A1\* 10/2016 Herzog .............. B62D 15/0295
2018/0147900 A1\* 5/2018 Shank .................... B60R 25/25

\* cited by examiner

HITCH ASSIST SYSTEM

FIELD OF THE INVENTION

The present disclosure generally relates to autonomous and semi-autonomous vehicle systems, and more particularly, to hitch assist systems that facilitate the hitching of a vehicle to a trailer.

BACKGROUND OF THE INVENTION

The process of hitching a vehicle to a trailer can be difficult, especially to those lacking experience. Accordingly, there is a need for a system that simplifies the process by assisting a user in a simple yet intuitive manner.

SUMMARY OF THE INVENTION

According to some aspects of the present disclosure, a hitch assist system is provided herein. The hitch assist system includes a mobile device remotely disposed from a vehicle and configured to receive a user input for adjusting an alignment position of a hitch assembly of a vehicle. The hitch assist system also includes a controller configured to generate commands for maneuvering the vehicle such that the hitch assembly is moved to an adjusted position at which the hitch assembly is aligned with a coupler of a trailer.

According to some aspects of the present disclosure, a method of correcting misalignment between a hitch assembly of a vehicle and a coupler of a trailer is provided herein. The method includes performing a vehicle maneuver. The method also includes receiving a user input via a mobile device remotely disposed from the vehicle for adjusting an alignment position of the hitch assembly. The method further includes generating commands through a vehicle controller for maneuvering the vehicle such that the hitch assembly is moved to an adjusted alignment position at which the hitch assembly is aligned with the coupler.

According to some aspects of the present disclosure, a mobile device communicatively coupled with a vehicle is provided herein. The mobile device includes a touchscreen display configured to display a view of a hitch assembly proximate a coupler of a trailer and register one or more touch events thereon for adjusting an alignment position of the hitch assembly to correct misalignment between the hitch assembly and the coupler.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
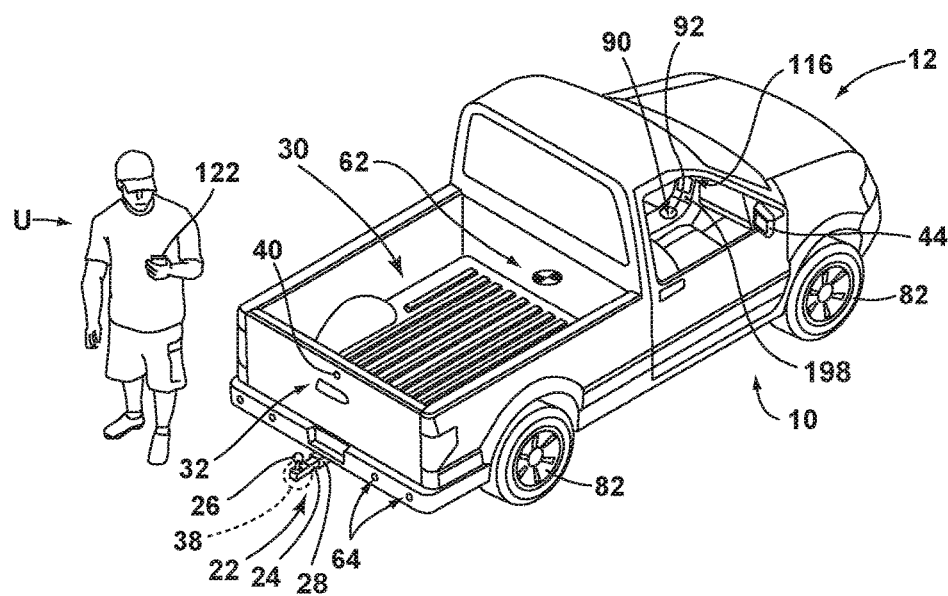
FIG. 1 is a top perspective view of a vehicle and a trailer, the vehicle being equipped with a hitch assistance system (also referred to as a "hitch assist" system), according to some examples.
Figure 1:
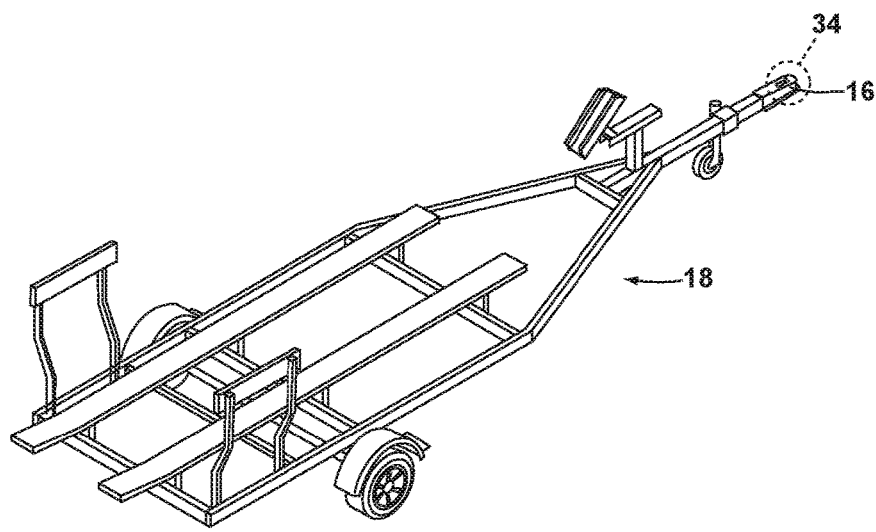

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a hitch assist system for a vehicle. The hitch assist system may include a mobile device remotely disposed from a vehicle and configured to receive a user input for adjusting an alignment position of a hitch assembly of a vehicle. A controller is configured to generate commands for maneuvering the vehicle such that the hitch assembly is moved to an adjusted position at which the hitch assembly is aligned with a coupler of a trailer.

Figure 2:
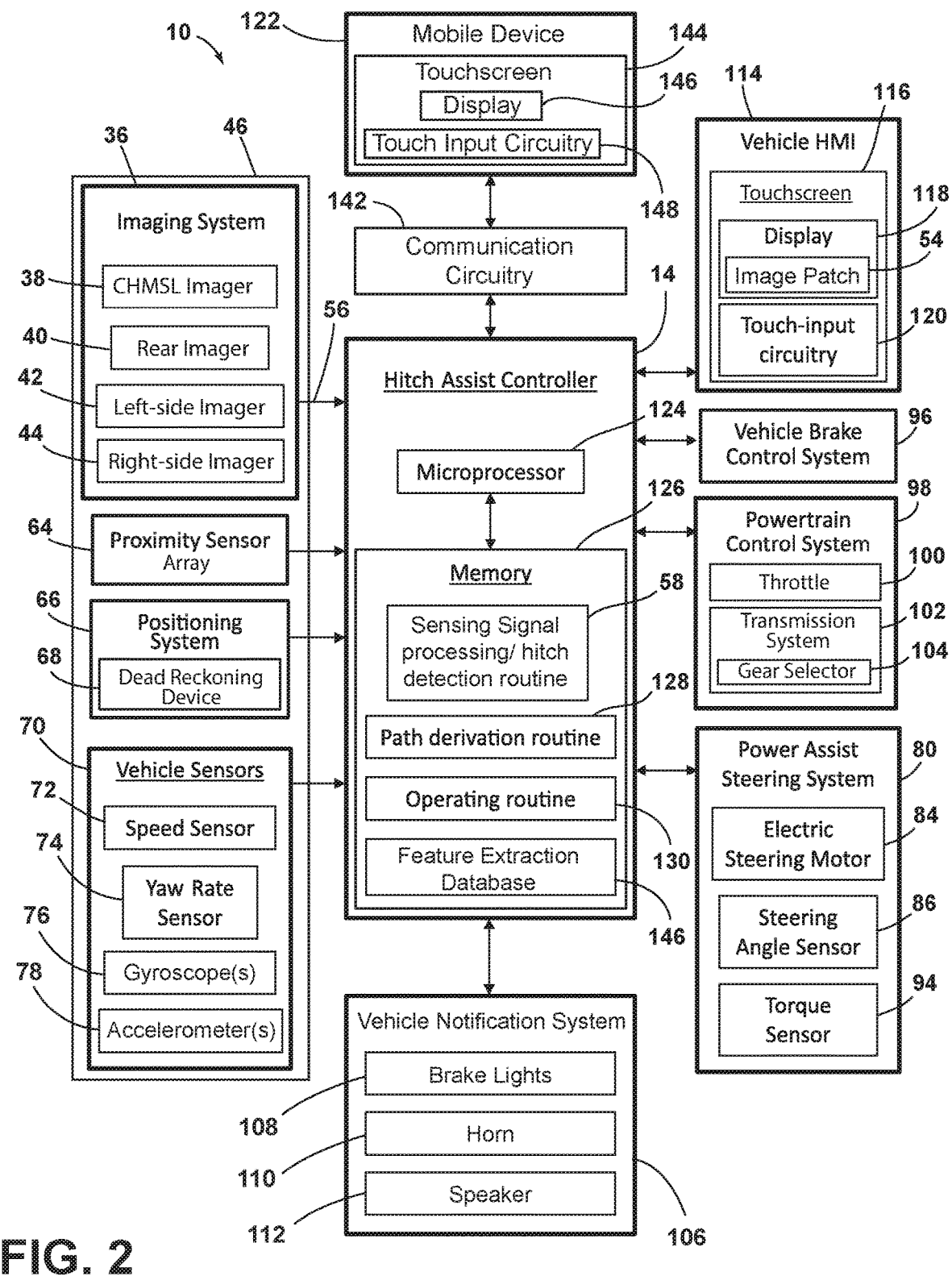
FIG. 2 is a block diagram illustrating various components of the hitch assist system, according to some examples.

Referring to FIGS. 1 and 2, reference numeral 10 designates a hitch assistance system (also referred to as a "hitch assist" system) for a vehicle 12. In particular, the hitch assist system 10 includes a controller 14 acquiring position data of a coupler 16 of a trailer 18 and deriving a vehicle path 20 (FIG. 3) to align a hitch assembly 22 of the vehicle 12 with the coupler 16. In some examples, the hitch assembly 22 may include a ball mount 24 supporting a hitch ball 26. The hitch ball 26 may be fixed on the ball mount 24 that extends from the vehicle 12 and/or the hitch ball 26 may be fixed to a portion of the vehicle 12, such as a bumper of the vehicle 12. In some examples, the ball mount 24 may couple with a receiver 28 that is fixed to the vehicle 12.

As shown in FIG. 1, the vehicle 12 is exemplarily embodied as a pickup truck having a truck bed 30 that is accessible via a rotatable tailgate 32. The hitch ball 26 may be received by a coupler 16 in the form of a coupler ball socket 34 that is provided at a terminal end portion of the trailer coupler 16. The trailer 18 is exemplarily embodied as a single axle trailer from which the coupler 16 extends longitudinally. It will be appreciated that additional examples of the trailer 18 may alternatively couple with the vehicle 12 to provide a pivoting connection, such as by connecting with a fifth wheel connector. It is also contemplated that additional examples of the trailer 18 may include more than one axle and may have various shapes and sizes configured for different loads and items, such as a box trailer or a flatbed trailer without departing from the teachings provided herein.

With respect to the general operation of the hitch assist system 10, as illustrated in FIG. 2, the hitch assist system 10 includes a sensing system 46 that includes various sensors and devices that obtain or otherwise provide vehicle status-related information. For example, in some instances, the sensing system 46 incorporates an imaging system 36 that includes one or more exterior imagers 38, 40, 42, 44, or any other vision-based device. The one or more imagers 38, 40, 42, 44 each include an area-type image sensor, such as a CCD or a CMOS image sensor, and image-capturing optics that capture an image of an imaging field of view (e.g., fields of view 48, 50, 52a, 52b, FIG. 5) defined by the image-capturing optics. In some instances, the one or more imagers 38, 40, 42, 44 may derive an image patch 54 from multiple image frames that may be shown on a display 118, 146. In various examples, the hitch assist system 10 may include any one or more of a center high-mount stop light (CHMSL) imager 38, a rear imager 40, a left-side side-view imager 42, and/or a right-side side-view imager 44, although other arrangements including additional or alternative imagers are possible without departing from the scope of the present disclosure.

In some examples, the imaging system 36 can include the rear imager 40 alone or can be configured such that the hitch assist system 10 utilizes only the rear imager 40 in a vehicle 12 with the multiple exterior imagers 38, 40, 42, 44. In some instances, the various imagers 38, 40, 42, 44 included in the imaging system 36 can be positioned to generally overlap in their respective fields of view, which in the depicted arrangement of FIG. 5 includes fields of view 48, 50, 52a, 52b to correspond with the CHMSL imager 38, the rear imager 40, and the side-view imagers 42 and 44, respectively. In this manner, image data 56 from two or more of the imagers 38, 40, 42, 44 can be combined in an image processing routine 58, or in another dedicated image processor within the imaging system 36, into a single image or image patch 54. In an extension of such examples, the image data 56 can be used to derive stereoscopic image data 56 that can be used to reconstruct a three-dimensional scene of the area or areas within overlapped areas of the various fields of view 48, 50, 52a, 52b, including any objects (e.g., obstacles or the coupler 16) therein.

In some examples, the use of two images including the same object can be used to determine a location of the object relative to the two imagers 38, 40, 42, and/or 44, given a known spatial relationship between the imagers 38, 40, 42, 44 through projective geometry of the imagers 38, 40, 42, 44. In this respect, the image processing routine 58 can use known programming and/or functionality to identify an object within the image data 56 from the various imagers 38, 40, 42, 44 within the imaging system 36. The image processing routine 58 can include information related to the positioning of any of the imagers 38, 40, 42, 44 present on the vehicle 12 or utilized by the hitch assist system 10, including relative to a center 62 (FIG. 1) of the vehicle 12. For example, the positions of the imagers 38, 40, 42, 44 relative to the center 62 of the vehicle 12 and/or to each other can be used for object positioning calculations and to result in object position data relative to the center 62 of the vehicle 12, for example, or other features of the vehicle 12, such as the hitch ball 26 (FIG. 1), with known positions relative to the center 62 of the vehicle 12 in a manner similar to that which is described in commonly assigned U.S. patent application Ser. No. 15/708,427, filed Sep. 19, 2017, and entitled "HITCH ASSIST SYSTEM WITH COUPLER IDENTIFICATION FEATURE AND COUPLER HEIGHT ESTIMATION," the entire disclosure of which is incorporated by reference herein.

With further reference to FIGS. 1 and 2, a proximity sensor 64 or an array thereof, and/or other vehicle sensors 70, may provide sensor signals that the controller 14 of the hitch assist system 10 processes with various routines to determine various objects proximate the vehicle 12, the trailer 18, and/or the coupler 16 of the trailer 18. The proximity sensor 64 may also be utilized to determine a height and position of the coupler 16. The proximity sensor 64 may be configured as any type of sensor, such as an ultrasonic sensor, a radio detection and ranging (RADAR) sensor, a sound navigation and ranging (SONAR) sensor, a light detection and ranging (LIDAR) sensor, a vision-based sensor, and/or any other type of sensor known in the art.

Figure 3:
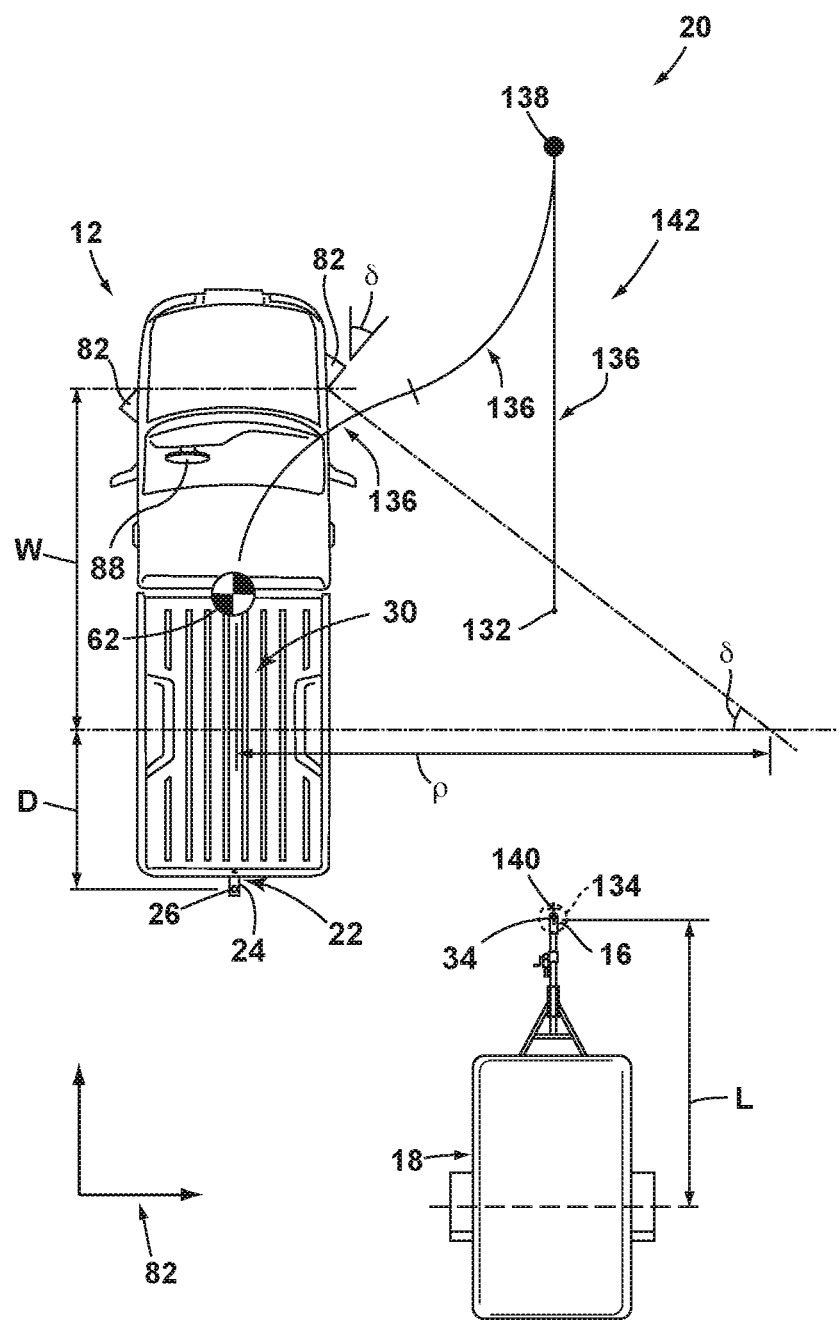
FIG. 3 is an overhead schematic view of the vehicle during a step of the alignment sequence with the trailer, according to some examples.
Figure 4:
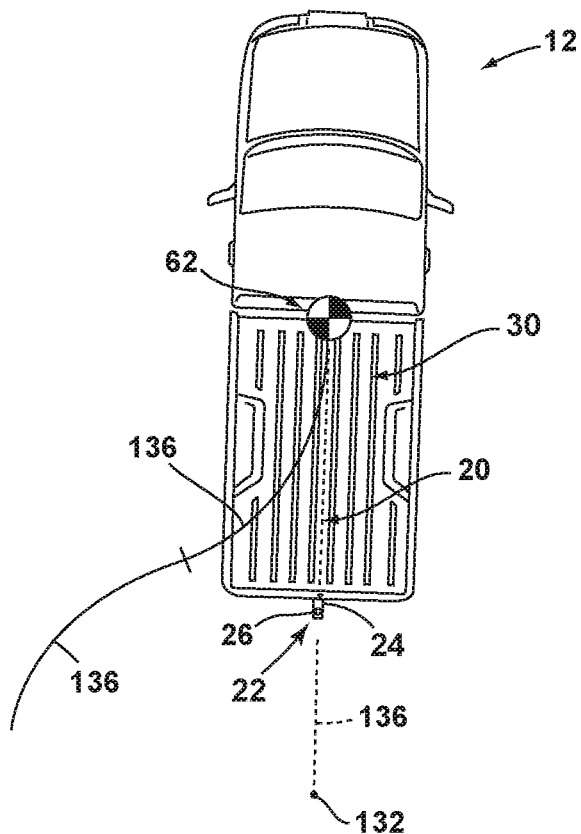
FIG. 4 is an overhead schematic view of the vehicle during a subsequent step of the alignment sequence with the trailer, according to some examples.
Figure 4:
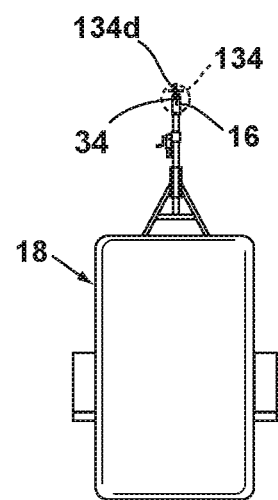

Referring still to FIGS. 1 and 2, a positioning system 66, which may include a dead reckoning device 68 or, in addition, or as an alternative, a global positioning system (GPS) that determines a coordinate location of the vehicle 12. For example, the dead reckoning device 68 can establish and track the coordinate location of the vehicle 12 within a localized coordinate system based at least on vehicle speed and/or steering angle δ (FIG. 3). The controller 14 may also be operably coupled with various vehicle sensors 70, such as a speed sensor 72 and a yaw rate sensor 74. Additionally, the controller 14 may communicate with one or more gyroscopes 76 and accelerometers 78 to measure the position, orientation, direction, and/or speed of the vehicle 12.

To enable autonomous or semi-autonomous control of the vehicle 12, the controller 14 of the hitch assist system 10 may be further configured to communicate with a variety of vehicle systems. According to some examples, the controller 14 of the hitch assist system 10 may control a power assist steering system 80 of the vehicle 12 to operate the steered road wheels 82 of the vehicle 12 while the vehicle 12 moves along a vehicle path 20. The power assist steering system 80 may be an electric power-assisted steering (EPAS) system that includes an electric steering motor 84 for turning the steered road wheels 82 to a steering angle δ based on a steering command generated by the controller 14, whereby the steering angle δ may be sensed by a steering angle sensor 86 of the power assist steering system 80 and provided to the controller 14. As described herein, the steering command may be provided for autonomously steering the vehicle 12 during a maneuver and may alternatively be provided manually via a rotational position (e.g., a steering wheel angle) of a steering wheel 88 (FIG. 3) or a steering input device 90, which may be provided to enable a driver to control or otherwise modify the desired curvature of the path 20 of vehicle 12. The steering input device 90 may be communicatively coupled to the controller 14 in a wired or wireless manner and provides the controller 14 with information defining the desired curvature of the path 20 of the vehicle 12. In response, the controller 14 processes the information and generates corresponding steering commands that are supplied to the power assist steering system 80 of the vehicle 12. In some examples, the steering input device 90 includes a rotatable knob 92 operable between a number of rotated positions that each provides an incremental change to the desired curvature of the path 20 of the vehicle 12.

In some examples, the steering wheel 88 of the vehicle 12 may be mechanically coupled with the steered road wheels 82 of the vehicle 12, such that the steering wheel 88 moves in concert with steered road wheels 82 via an internal torque during autonomous steering of the vehicle 12. In such instances, the power assist steering system 80 may include a torque sensor 94 that senses torque (e.g., gripping and/or turning) on the steering wheel 88 that is not expected from the autonomous control of the steering wheel 88 and therefore is indicative of manual intervention by the driver. In some examples, the external torque applied to the steering wheel 88 may serve as a signal to the controller 14 that the driver has taken manual control and for the hitch assist system 10 to discontinue autonomous steering functionality. However, as provided in more detail below, the hitch assist system 10 may continue one or more functions/operations while discontinuing the autonomous steering of the vehicle 12.

The controller 14 of the hitch assist system 10 may also communicate with a vehicle brake control system 96 of the vehicle 12 to receive vehicle speed information such as individual wheel speeds of the vehicle 12. Additionally or alternatively, vehicle speed information may be provided to the controller 14 by a powertrain control system 98 and/or the vehicle speed sensor 72, among other conceivable means. The powertrain control system 98 may include a throttle 100 and a transmission system 102. A gear selector 104 may be disposed within the transmission system 102 that controls the mode of operation of the vehicle transmission system 102 through one or more gears of the transmission system 102. In some examples, the controller 14 may provide braking commands to the vehicle brake control system 96, thereby allowing the hitch assist system 10 to regulate the speed of the vehicle 12 during a maneuver of the vehicle 12. It will be appreciated that the controller 14 may additionally or alternatively regulate the speed of the vehicle 12 via interaction with the powertrain control system 98.

Through interaction with the power assist steering system 80, the vehicle brake control system 96, and/or the powertrain control system 98 of the vehicle 12, the potential for unacceptable conditions can be reduced when the vehicle 12 is moving along the path 20. Examples of unacceptable conditions include, but are not limited to, a vehicle overspeed condition, sensor failure, and the like. In such circumstances, the driver may be unaware of the failure until the unacceptable backup condition is imminent or already happening. Therefore, it is disclosed herein that the controller 14 of the hitch assist system 10 can generate a notification signal corresponding to a notification of an actual, impending, and/or anticipated unacceptable backup condition, and prior to driver intervention, generate a countermeasure to prevent such an unacceptable backup condition.

According to some examples, the controller 14 may communicate with one or more devices, including a vehicle notification system 106, which may prompt visual, auditory, and tactile notifications and/or warnings. For instance, vehicle brake lights 108 and/or vehicle emergency flashers may provide a visual alert. A vehicle horn 110 and/or speaker 112 may provide an audible alert. Additionally, the controller 14 and/or vehicle notification system 106 may communicate with a user-input device, such as a human-machine interface (HMI) 114 of the vehicle 12. The HMI 114 may include a touchscreen 116, or other user-input device, such as a navigation and/or entertainment display 118 mounted within a cockpit module, an instrument cluster, and/or any other location within the vehicle 12, which may be capable of displaying images, indicating the alert.

In some instances, the HMI 114 further includes an input device, which can be implemented by configuring the display 118 as a portion of the touchscreen 116 with circuitry 120 to receive an input corresponding with a location over the display 118. Other forms of input, including one or more joysticks, digital input pads, or the like can be used in place or in addition to touchscreen 116.

Further, the hitch assist system 10 may be communicatively coupled via a communication circuitry 142 with one or more handheld or mobile devices 122 (FIG. 1), which may additionally and/or alternatively be configured as the user-input device. The communication circuitry 142 may include a radio frequency transmitter and receiver for transmitting and receiving signals. The signals may be configured to transmit data and may correspond to various communication protocols. The communication circuitry 142 may be used to send and receive data and/or audiovisual content. The communication circuitry 142 may utilize one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIG- BEE transceiver, a Wi-Fi transceiver, an IrDA transceiver, an RFID transceiver, etc.), local area networks (LAN), wide area networks (WAN), including the Internet, GSM, CDMA, WCDMA, GPRS, MBMS, WiMax, DVB-H, ISDB-T, etc., as well as advanced communication protocols that may be developed at a later time.

The mobile device 122 may also include a touchscreen 144 having a display 146 for displaying one or more graphics 150 (FIG. 8) and other information to a user U and touch input circuitry 148. For instance, the mobile device 122 may display one or more graphics 150 of the trailer 18 on the display 146 and may be further able to receive remote user inputs via the touch input circuitry 148. In addition, the mobile device 122 may provide feedback information, such as visual, audible, and tactile alerts. It will be appreciated that the mobile device 122 may be any one of a variety of computing devices and may include a processor and memory. For example, the mobile device 122 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

The controller 14 is configured with a microprocessor 124 and/or other analog and/or digital circuitry for processing one or more logic routines stored in a memory 126. The logic routines may include one or more routines including the image processing routine and hitch detection routine 58, a path derivation routine 128, and an operating routine 130. Information from the imager 40 or other components of the sensing system 46 can be supplied to the controller 14 via a communication network of the vehicle 12, which can include a controller area network (CAN), a local interconnect network (LIN), or other protocols used in the automotive industry. It will be appreciated that the controller 14 may be a stand-alone dedicated controller or may be a shared controller integrated with the imager 40 or other component of the hitch assist system 10 in addition to any other conceivable onboard or off-board vehicle control systems.

The controller 14 may include any combination of software and/or processing circuitry suitable for controlling the various components of the hitch assist system 10 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

With further reference to FIGS. 2-6, the controller 14 may generate vehicle steering information and commands as a function of all or a portion of the information received. Thereafter, the vehicle steering information and commands may be provided to the power assist steering system 80 for effecting the steering of the vehicle 12 to achieve a commanded path 20 of travel for alignment with the coupler 16 of the trailer 18. It will further be appreciated that the image processing routine 58 may be carried out by a dedicated processor, for example, within a stand-alone imaging system 36 for the vehicle 12 that can output the results of its image processing to other components and systems of vehicle 12, including the microprocessor 124. Further, any system, computer, processor, or the like that completes image processing functionality, such as that described herein, may be referred to herein as an "image processor" regardless of other functionality it may also implement (including simultaneously with executing the image processing routine 58).

In some examples, the image processing routine 58 can be programmed or otherwise configured to locate the coupler 16 within the image data 56. In some instances, the image processing routine 58 can identify the coupler 16 within the image data 56 based on stored or otherwise known visual characteristics of the coupler 16 or hitches in general. In some instances, a marker in the form of a sticker or the like may be affixed with trailer 18 in a specified position relative to coupler 16 in a manner similar to that which is described in commonly assigned U.S. Pat. No. 9,102,271, entitled "TRAILER MONITORING SYSTEM AND METHOD," the entire disclosure of which is incorporated by reference herein. In such examples, the image processing routine 58 may be programmed with identifying characteristics of the marker for location in the image data 56, as well as the positioning of the coupler 16 relative to such a marker so that the location of the coupler 16 can be determined based on the marker location. Additionally or alternatively, the controller 14 may seek confirmation of the coupler 16, via a prompt on the touchscreen 116 and/or the mobile device 122. If the coupler 16 determination is not confirmed, further image processing may be provided, or user-adjustment of the position 134 of the coupler 16 may be facilitated, either using the touchscreen 116 or another input to allow the user U to move the depicted position 134 of the coupler 16 on the touchscreen 116, which the controller 14 uses to adjust the determination of the position 134 of the coupler 16 with respect to the vehicle 12 based on the above-described use of the image data 56. Alternatively, the user U can visually determine the position 134 of the coupler 16 within an image presented on HMI 114 and can provide a touch input in a manner similar to that which is described in co-pending, commonly-assigned U.S. patent application Ser. No. 15/583, 014, filed May 1, 2017, and entitled "SYSTEM TO AUTOMATE HITCHING A TRAILER," the entire disclosure of which is incorporated by reference herein. The image processing routine 58 can then correlate the location of the touch input with the coordinate system applied to the image patch 54.

As shown in FIGS. 3-6, in some exemplary instances of the hitch assist system 10, the image processing routine 58 and operating routine 130 may be used in conjunction with each other to determine the path 20 along which the hitch assist system 10 can guide the vehicle 12 to align the hitch ball 26 and the coupler 16 of the trailer 18. In the example shown, an initial position of the vehicle 12 relative to the trailer 18 may be such that the coupler 16 is in the field of view 52a of the side imager 42, with the vehicle 12 being positioned latitudinally from the trailer 18 but with the coupler 16 being almost longitudinally aligned with the hitch ball 26. In this manner, upon initiation of the hitch assist system 10, such as by user input on the touchscreen 116, for example, the image processing routine 58 can identify the coupler 16 within the image data 56 of the imager 42 and estimate the position 134 of the coupler 16 relative to the hitch ball 26 using the image data 56 in accordance with the examples discussed above or by other known means, including by receiving focal length information within image data 56 to determine a distance $D_c$ to the coupler 16 and an angle $\alpha_c$ of offset between the coupler 16 and the longitudinal axis of vehicle 12. Once the positioning $D_c$, $\alpha_c$ of the coupler 16 has been determined and, optionally, confirmed by the user U, the controller 14 can take control of at least the vehicle steering system 80 to control the movement of the vehicle 12 along the desired path 20 to align the vehicle hitch ball 26 with the coupler 16.

Continuing with reference to FIG. 3, the controller 14 (FIG. 2), having estimated the positioning $D_c$, $\alpha_c$ of the coupler 16, as discussed above, can, in some examples, execute the path derivation routine 128 to determine the vehicle path 20 to align the vehicle hitch ball 26 with the coupler 16. The controller 14 can store various characteristics of vehicle 12, including a wheelbase W, a distance D from the rear axle to the hitch ball 26, which is referred to herein as the drawbar length, as well as a maximum angle to which the steered wheels 82 can be turned $\delta_{max}$. As shown, the wheelbase W and the current steering angle δ can be used to determine a corresponding turning radius ρ for the vehicle 12 according to the equation:

$$\rho = \frac{1}{W \tan \delta}, \quad (1)$$

in which the wheelbase W is fixed and the steering angle δ can be controlled by the controller 14 by communication with the steering system 80, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

The path derivation routine 128 can be programmed to derive the vehicle path 20 to align a known location of the vehicle hitch ball 26 with the estimated position 134 of the coupler 16 that takes into account the determined minimum turning radius $\rho_{min}$, which may allow the path 20 to use the minimum amount of space and maneuvers. In this manner, the path derivation routine 128 can use the position of the vehicle 12, which can be based on the center 62 of the vehicle 12, a location along the rear axle, the location of the dead reckoning device 68, or another known location on the coordinate system, to determine both a lateral distance to the coupler 16 and a forward or rearward distance to coupler 16 and derive the path 20 that achieves lateral and/or forward-backward movement of the vehicle 12 within the limitations of the steering system 80. The derivation of the path 20 further takes into account the positioning of the hitch ball 26 relative to the tracked location of vehicle 12 (which may correspond with the center 62 of mass of the vehicle 12, the location of a GPS receiver, or another specified, known area) to determine the needed positioning of the vehicle 12 to align the hitch ball 26 with the coupler 16.

Once the projected path 20, including the endpoint 132, has been determined, the controller 14 may at least control the steering system 80 of the vehicle 12 with the powertrain control system 98 and the brake control system 96 (whether controlled by the driver or by the controller 14) controlling the speed (forward or rearward) of the vehicle 12. In this manner, the controller 14 can receive data regarding the position of the vehicle 12 during movement thereof from the positioning system 66 while controlling the steering system 80 to maintain the vehicle 12 along the path 20. The path 20, having been determined based on the vehicle 12 and the geometry of steering system 80, can adjust the steering angle δ, as dictated by the path 20, depending on the position of the vehicle 12 therealong.

As illustrated in FIG. 3, the initial positioning of the trailer 18 relative to the vehicle 12 may be such that forward movement of vehicle 12 is needed for the desired vehicle path 20, such as when the trailer 18 is latitudinally offset to the side of vehicle 12. In this manner, the path 20 may include various segments 136 of forward driving and/or rearward driving of the vehicle 12 separated by inflection points 138 at which the vehicle 12 transitions between forward and rearward movement. As used herein, "inflection points" are any point along the vehicle path 20 in which a vehicle condition is changed. The vehicle conditions include, but are not limited to, a change in speed, a change in steering angle δ, a change in vehicle direction, and/or any other possible vehicle condition that may be adjusted. For example, if a vehicle speed is altered, an inflection point 138 may be at the location where the speed was altered. In some examples, the path derivation routine 128 can be configured to include a straight backing segment 136 for a defined distance before reaching the point at which the hitch ball 26 is aligned with the position 134 of the coupler 16. The remaining segments 136 can be determined to achieve the lateral and forward/backward movement within the smallest area possible and/or with the lowest number of overall segments 136 or inflection points 138. In the illustrated example of FIG. 3, the path 20 can include two segments 136 that collectively traverse the lateral movement of the vehicle 12, while providing a segment 136 of straight rearward backing to bring the hitch ball 26 into an offset position 134 of the coupler 16, one of which includes forward driving with a maximum steering angle $\delta_{max}$ in the rightward-turning direction and the other including forward driving with a maximum steering angle $\delta_{max}$ in the leftward-turning direction. Subsequently, an inflection point 138 is included in which the vehicle 12 transitions from forward driving to rearward driving followed by the previously-mentioned straight rearward backing segment 136. It is noted that variations in the depicted path 20 may be used, including a variation with a single forward-driving segment 136 at a rightward steering angle δ less than the maximum steering angle $\delta_{max}$, followed by an inflection point 138 and a rearward driving segment 136 at a maximum leftward steering angle $\delta_{max}$ with a shorter straight backing segment 136, with still further paths 20 being possible.

In some instances, the hitch assist system 10 may be configured to operate with the vehicle 12 in reverse only, in which case, the hitch assist system 10 can prompt the driver to drive vehicle 12, as needed, to position the trailer 18 in a designated area relative to the vehicle 12, including to the rear thereof so that path derivation routine 128 can determine a vehicle path 20 that includes rearward driving. Such instructions can further prompt the driver to position the vehicle 12 relative to the trailer 18 to compensate for other limitations of the hitch assist system 10, including a particular distance for identification of the coupler 16, a minimum offset angle $\alpha_c$, or the like. It is further noted that the estimates for the positioning $D_c$, $\alpha_c$ of the coupler 16 may become more accurate as the vehicle 12 traverses the path 20, including to position the vehicle 12 in front of the trailer 18 and as the vehicle 12 approaches the coupler 16. Accordingly, such estimates can be derived and used to update the path derivation routine 128, if desired, in the determination of the adjusted initial endpoint 132 for the path 20.

Figure 5:
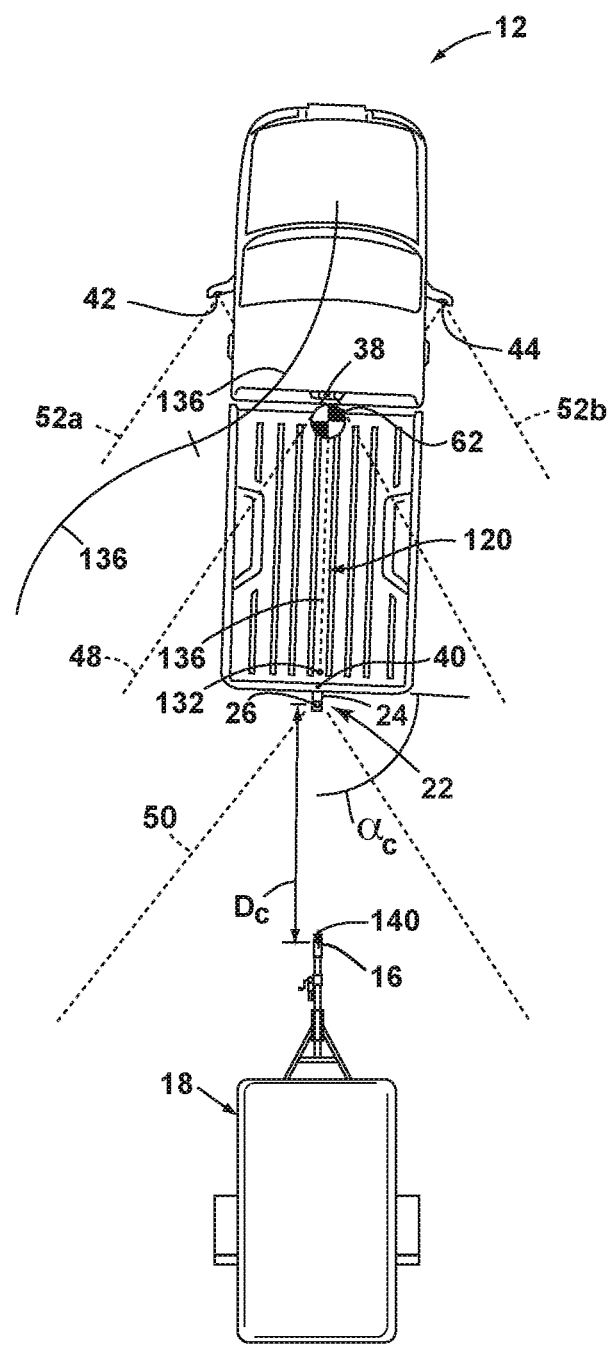
FIG. 5 is an overhead schematic view of the vehicle during a subsequent step of the alignment sequence with the trailer, according to some examples.
Figure 6:
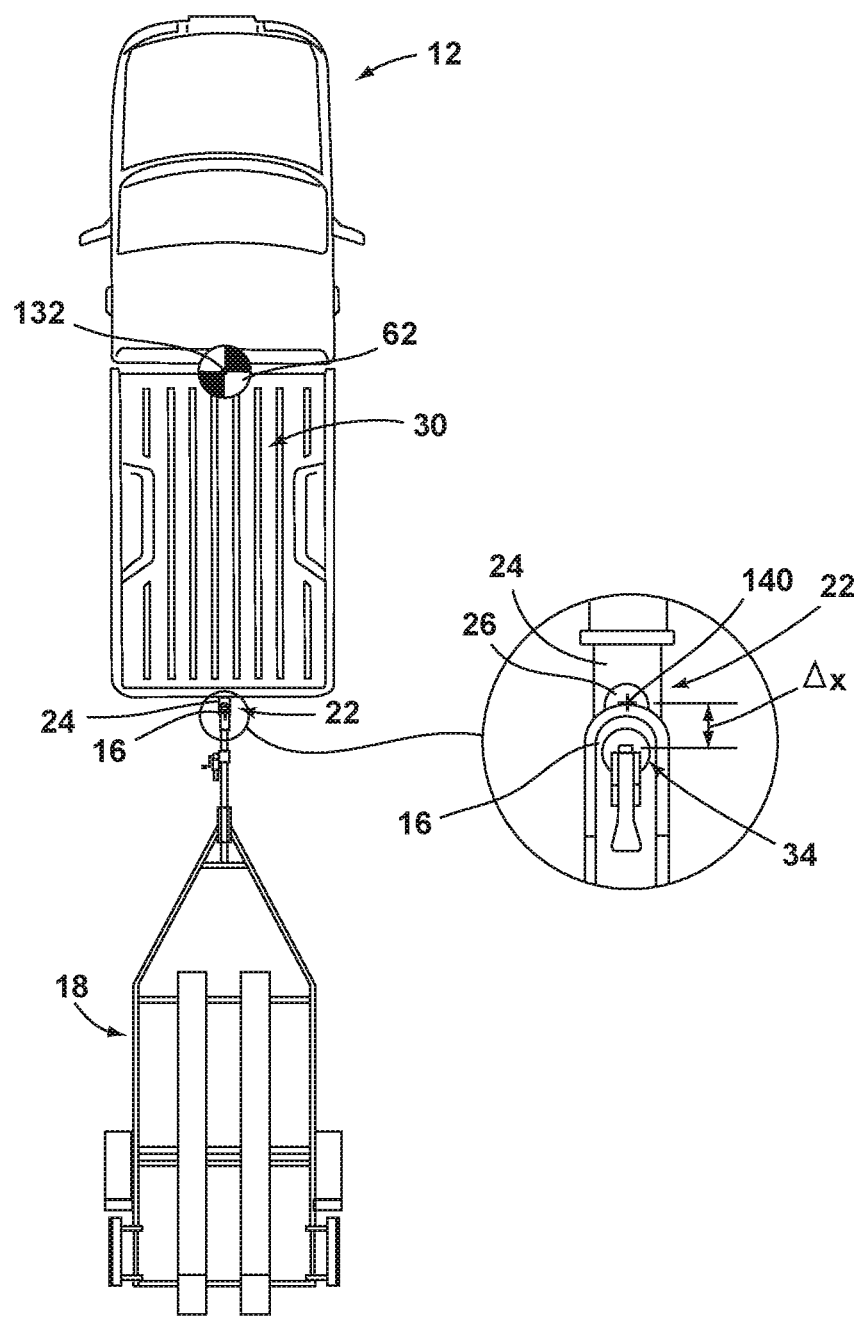
FIG. 6 is an overhead schematic view of the vehicle during a subsequent step of the alignment sequence with the trailer and showing the position of a hitch ball of the vehicle at an end of a derived alignment path, according to some examples.

Referring to FIGS. 5 and 6, a strategy for determining an initial endpoint 132 for the vehicle path 20 that places hitch ball 26 in a projected position for alignment with the coupler 16 involves calculating the actual or an approximate trajectory for movement of the coupler 16 while lowering the coupler 16 onto the hitch ball 26. The initial endpoint 132 is then derived, as discussed above or otherwise, to place hitch ball 26 at the desired location 140 on that trajectory. In effect, such a scheme is implemented by determining the difference between the height $H_c$ of the coupler 16 and the height $H_b$ of the hitch ball 26, which represents the vertical distance by which coupler 16 will be lowered to engage with hitch ball 26. The determined trajectory is then used to relate the vertical distance with a corresponding horizontal distance $\Delta x$ of coupler 16 movement in the driving direction that results from the vertical distance. This horizontal distance $\Delta x$ can be input into the path derivation routine 128 as the desired initial endpoint 132 thereof or can be applied as an offset to the initial endpoint 132 derived from the initially determined position 134 of the coupler 16 when the path 20 ends with the straight-backing segment 136, as illustrated in FIG. 3.

Referring again to FIGS. 5 and 6, the operating routine 130 may continue to guide the vehicle 12 until the hitch ball 26 is in the desired final endpoint 140 relative to the coupler 16 for the coupler 16 to engage with the hitch ball 26 when the coupler 16 is lowered into alignment and/or engagement therewith. In the examples discussed above, the image processing routine 58 monitors the positioning $D_c$, $\alpha_c$ of the coupler 16 during execution of the operating routine 130, including as the coupler 16 comes into clearer view of the rear imager 40 with continued movement of the vehicle 12 along the path 20. As discussed above, the position of the vehicle 12 can also be monitored by the dead reckoning device 68 with the position 134 of the coupler 16 being updated and fed into the path derivation routine 128 in case the path 20 and or the initial endpoint 132 can be refined or should be updated (due to, for example, improved height $H_c$, distance $D_c$, or offset angle $\alpha_c$ information due to closer resolution or additional image data 56), including as the vehicle 12 moves closer to the trailer 18. In some instances, the coupler 16 can be assumed static such that the position of the vehicle 12 can be tracked by continuing to track the coupler 16 to remove the need for use of the dead reckoning device 68. In a similar manner, a modified variation of the operating routine 130 can progress through a predetermined sequence of maneuvers involving steering of the vehicle 12 at or below a maximum steering angle $\delta_{max}$, while tracking the position $D_c$, $\alpha_c$ of the coupler 16 to converge the known relative position of the hitch ball 26 to the desired final endpoint 140 thereof relative to the tracked position 134 of the coupler 16.

Figure 7A:
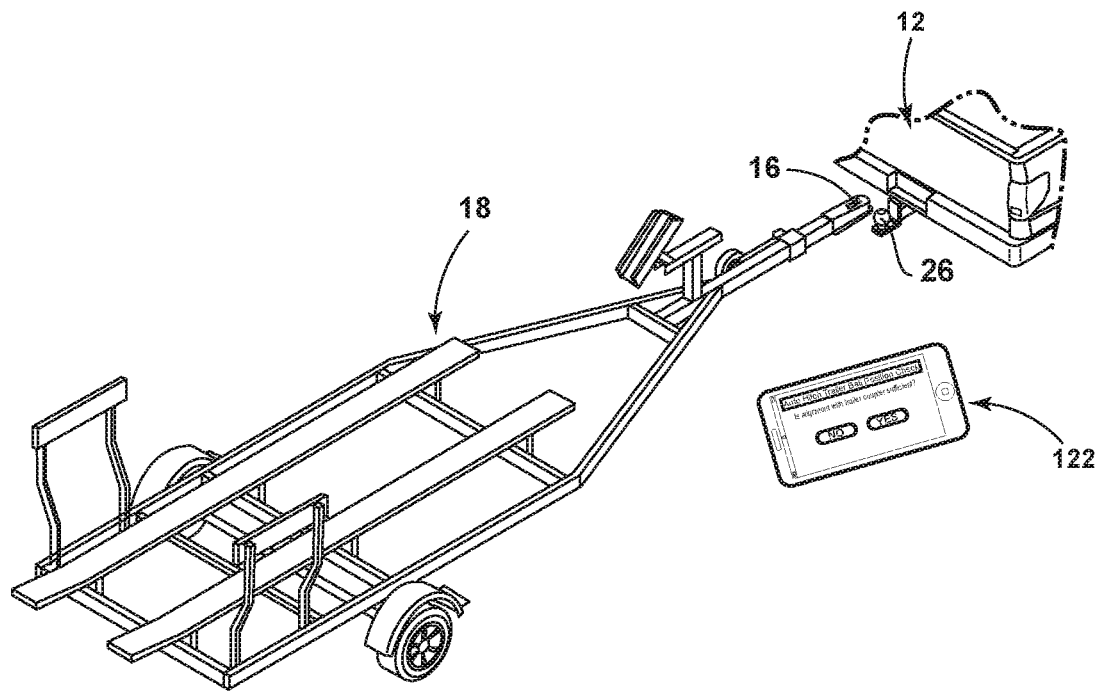
FIG. 7A is a perspective view of a coupler of the trailer proximate but misaligned with a hitch assembly of the vehicle, according to some examples.
Figure 7B:
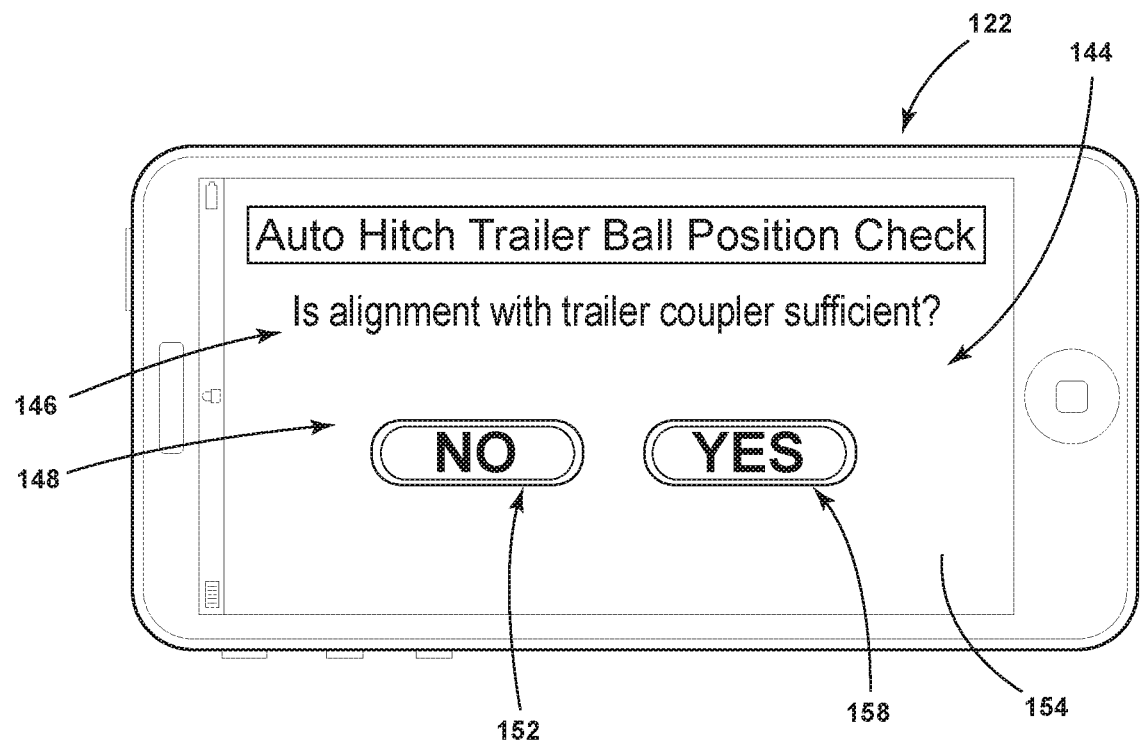
FIG. 7B is a perspective view of an exemplary mobile device that is communicatively coupled with the vehicle, according to some examples.

Referring to FIGS. 7A and 7B, upon completion of a hitch operation during use of the hitch assist system 10, the hitch ball 26 may be still be offset and/or unaligned with the coupler 16 possibly due to calibration issues, environmental conditions, and/or any other factor. In some examples, the mobile device 122 may be configured to operate an application 152 and/or receive instructions from the controller 14 (FIG. 2) to assist a user U of the vehicle 12 in further alignment of the hitch ball 26 with the coupler 16 from the final endpoint 140 (FIG. 6) to an alignment position. In some examples, the mobile device 122 may comprise a camera system or imager operable to capture at least one image associated with dimensional data, and/or any image data that may be utilized in the alignment process and/or utilization of the hitch assist system 10. Additionally and/or alternatively, the application 152 on the mobile device 122 may provide instructions therein for further alignment of the hitch ball 26 with the coupler 16. In some instances, the application 152 provides a user interface 154 to input a user-defined offset 156 (FIG. 9) between the hitch ball 26 and coupler 16. In response to the user-defined offset 156, the vehicle 12 may be maneuvered to place the vehicle 12 at a user-defined alignment position.

The user interface 154 is configured to provide instructions to the user U corresponding to steps for further aligning the hitch ball 26 and coupler 16 if needed and/or desired. For example, the mobile device 122 may prompt the user U to determine whether alignment of the hitch ball 26 and coupler 16 is sufficient for coupling. If the alignment is sufficient, the hitch assist operations may be complete. If an offset between the hitch ball 26 and coupler 16 exists that inhibits connection of the coupler 16 to the hitch ball 26, the user interface 154 may provide instructions for the user U to define the offset 156 and/or a defined alignment position for the hitch ball 26 that would place the hitch ball 26 in alignment with the coupler 16. In response to the defined offset 156 and/or a defined alignment position, an additional hitch assist operation may be performed to maneuver the vehicle 12 to the defined offset 156 and/or a defined alignment position.

Referring to FIGS. 8-10B, in some examples, the mobile device 122 may also be configured to run software configured to perform steps for the alignment of the hitch ball 26 and the coupler 16. The software may be stored in a memory of the mobile device 122 and include various steps and instructions to provide instructions to a processor of the mobile device 122 to perform a hitch assist operation. In some examples, the controller 14 may display a message on the display 146 alerting the user U that the controller 14 is receiving data from the mobile device 122. The controller 14 may further display a graphic 150 or image representing the trailer 18 and the vehicle 12. Additionally, and/or alternatively, the controller 14 may display an image or image patch 54 generated by one or more imagers on the display 146 of the vehicle 12 and/or the trailer 18.

Figure 8:
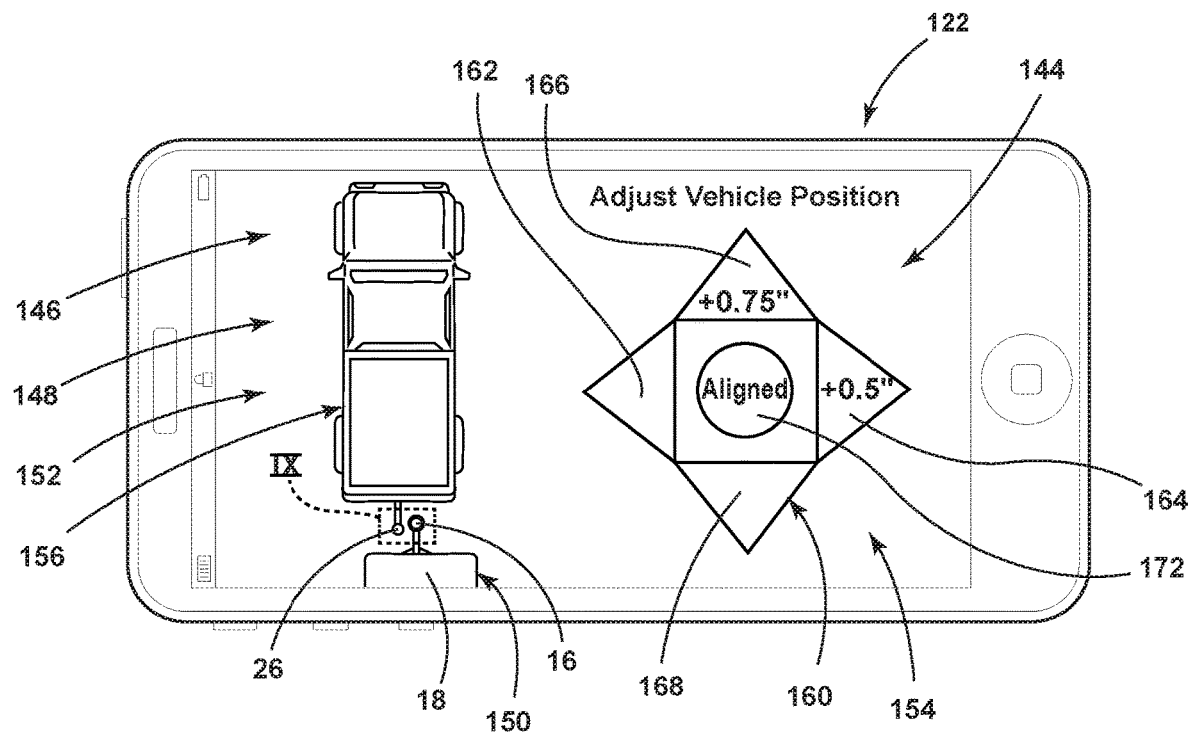
FIG. 8 is a front perspective view of an exemplary user interface on the mobile device, according to some examples.
Figure 9:
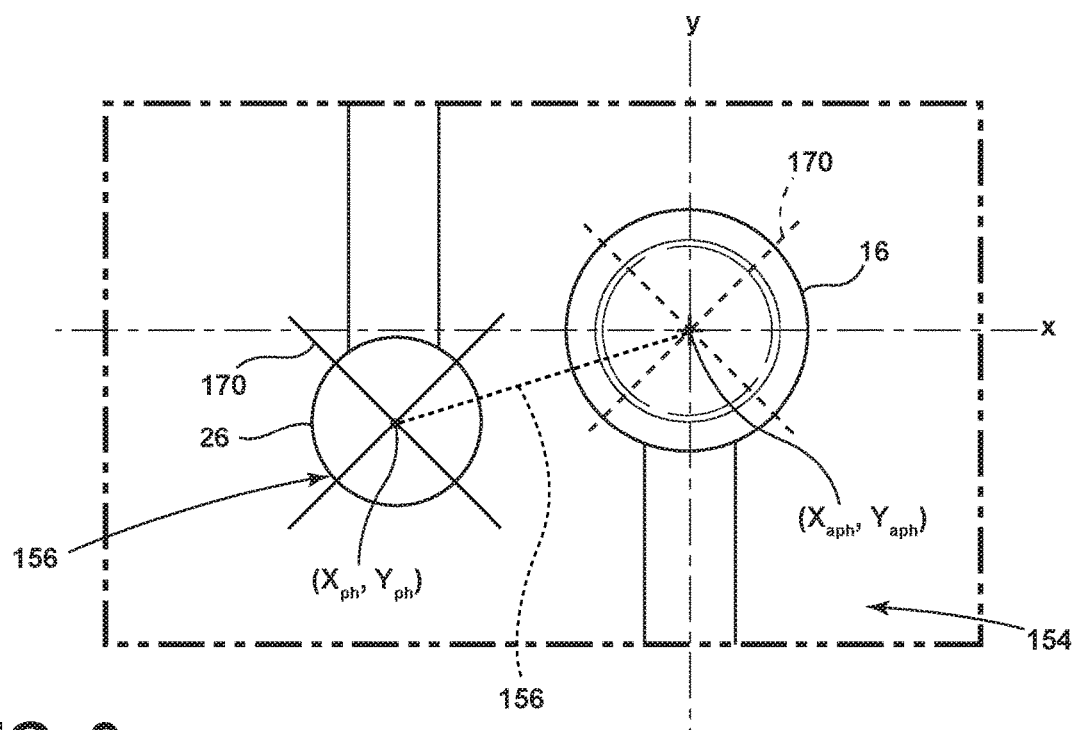
FIG. 9 is an enhanced view of area IX of FIG. 8.

In the depicted example of FIGS. 8 and 9, the graphic 150 corresponds to a top view showing the hitch ball 26 in an unaligned position proximate to the coupler 16. Ideally, the hitch ball 26 is vertically aligned with the coupler 16 at the alignment position. However, for purposes of illustration, the hitch ball 26 is exemplarily shown misaligned with the coupler 16. For clarity purposes, an enlarged view of the misalignment between the hitch ball 26 and the coupler 16 is shown in FIG. 9. As shown, the hitch ball 26 is misaligned with the coupler 16 in a longitudinal direction (e.g., y-axis) and lateral direction (e.g., x-axis). Specifically, the hitch ball 26 is exemplarily shown to be located slightly past and to the left of the coupler 16. In such a scenario, it is difficult to connect the hitch ball 26 to the coupler 16 without repositioning the vehicle 12 and/or trailer 18. For purposes of clarity and understanding, the misalignment between the hitch ball 26 and the coupler 16 is exaggerated.

When misalignment between the hitch ball 26 and the coupler 16 exists, the user U selects an adjustment feature 158, which is shown as a virtual button on the display 146 of FIG. 7B. In some instances, the display 146 is configured to generate a graphical icon 160 having multiple touchpoints 162, 164, 166, 168 for allowing a user U to adjust the alignment position of the hitch ball 26 in relation to the coupler 16. In the depicted example, touchpoints 162 and 164 are graphically represented as left and right arrows, respectively, and allow the user U to adjust the alignment position of the hitch ball 26 in a lateral direction. In contrast, touchpoints 166 and 168 are graphically represented as up and down arrows, respectively, and allow the user U to adjust the alignment position of the hitch ball 26 in a longitudinal direction.

The user U may perform one or more touch events on one or more of the touchpoints 162, 164, 166, 168 to adjust the alignment position of the hitch ball 26. For visual reference a cursor 170 (FIG. 9) or other graphic 150 is generated on the display 146 to graphically represent the hitch ball 26. The cursor 170 initially coincides with the hitch ball 26 in the alignment position and each touch event on a given touchpoint 162, 164, 166, 168 incrementally moves the cursor 170 in the direction specified by the corresponding arrow. With respect to the scenario depicted in FIGS. 8 and 9, the user U performs one or more touch events on each of touchpoints 164 and 166 to move the cursor 170 to an adjusted position at which the cursor 170 coincides with the coupler 16.

The alignment position of the hitch ball 26, as given by coordinates ($X_{ph}$, $Y_{ph}$) of the cursor 170, and the adjusted alignment position of the hitch ball 26, as given by coordinates ($X_{aph}$, $Y_{aph}$) of the cursor 170, may be stored by the controller 14 and may correspond to real-world coordinates of the hitch ball 26 determined by the controller 14 based on captured images, positional data supplied by onboard or remote devices, and/or other sources of information known by a skilled artisan. Additionally, the controller 14 may determine a difference in position between the pre-hitch and adjusted alignment positions of the hitch ball 26. For visual reference, the graphical icon 160 is configured to display the difference in position between the alignment position and the adjusted alignment position. For example, a difference in position (e.g., +0.75 inches) in the longitudinal direction may be generated on touchpoint 166 and a difference in position (e.g., +0.5 inches) in the lateral direction may be generated on touchpoint 164. Once the user U is satisfied with the adjusted alignment position of the hitch ball 26, the user U may confirm the selection by touching virtual button 172. Once confirmed, the controller 14 generates commands for maneuvering the vehicle 12 such that the hitch ball 26 is moved to the adjusted alignment position at which the hitch ball 26 is aligned with the coupler 16. As described herein, the maneuvering of the vehicle 12 may occur autonomously or semi-autonomously.

It will be appreciated that the mobile device 122 may be operable to process each of the steps of aligning the hitch ball 26 with the coupler 16 by receiving instructions from the controller 14 via the communication circuitry 142 and/or by completing processing steps stored in a memory in the form of a software application 152. The processing steps may include image, graphics 150, detailed text instructions, audio instructions, video instructions, and various forms of media configured to assist in the alignment process.

The mobile device 122 may further be configured to access a variety of informative media relating to the alignment of the vehicle 12 relative the trailer 18. The media may be accessed from the controller 14 via the communication circuitry 142, a memory of the mobile device 122, and may be accessed via a wireless network (e.g. a wireless data network). The mobile device 122 may be configured to communicate with the communication circuitry 142 and/or the wireless network via a communication circuit 174 as discussed in reference to FIG. 11. In some examples, the mobile device 122 may further be operable to communicate with a wireless server providing for real-time help, such as live chat and/or live video support via the wireless network. In this way, the alignment of the vehicle 12 and the trailer 18 may be completed efficiently by accessing a variety of instructions providing for a convenient and simple alignment process.

Figure 10A:
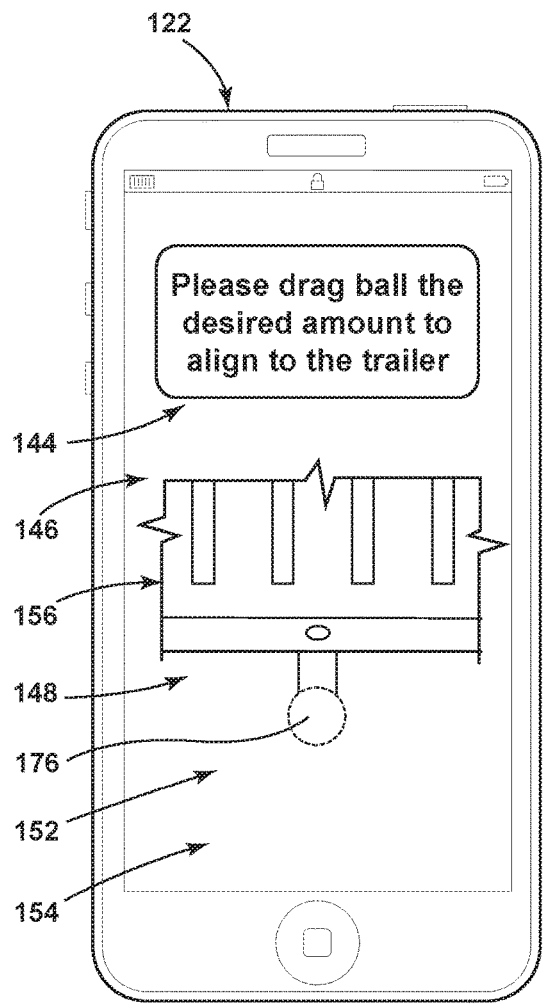
FIG. 10A is a front view of the mobile device having a user interface with alignment instructions for a user, according to some examples.
Figure 10B:
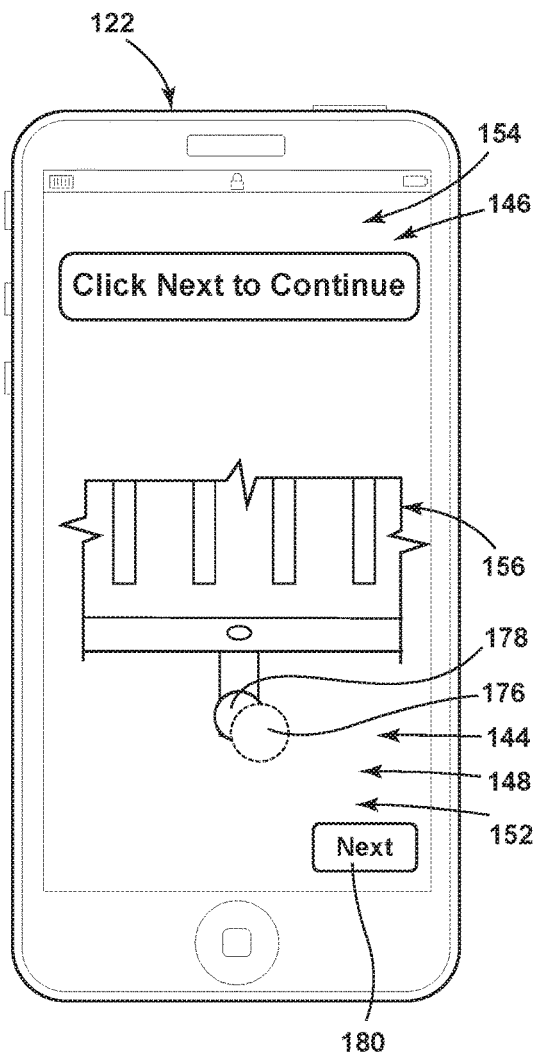
FIG. 10B is a front view of the user interface of FIG. 10A with an exemplary alignment adjustment made by the user, according to some examples.

Referring to FIGS. 10A and 10B, an alternative user interface 154 is exemplarily illustrated in which a user U may perform one or more touch events on the display 146 of the mobile device 122 for identifying an actual position of the hitch ball 26 relative the coupler 16 upon completion of a hitch assist operation. For example, upon completion of a hitch assist operation, the hitch assist system 10 may detect that the hitch ball 26 and the coupler 16 are vertically aligned. However, as provided herein, an offset between the components may still exist. Thus, the user U may define the current position of the coupler 16 relative to the hitch ball 26 through one or more touch events by defining the offset 156 between a virtual coupler 176 and a virtual hitch ball 178. Once the actual location of the virtual coupler 176 relative to the virtual hitch ball 178 is defined by the user U through use of an acceptance and/or alignment button 180, the controller 14 generates commands for maneuvering the vehicle 12 such that the hitch ball 26 is moved to the adjusted alignment position at which the hitch ball 26 is aligned with the coupler 16. As described herein, the maneuvering of the vehicle 12 may occur autonomously or semi-autonomously. It will be appreciated that the sensing system 46 may monitor the trailer 18, the coupler 16, and/or any other obstacles proximate the vehicle 12 such that the vehicle 12 is prevented from contacting any of these items while performing the additional alignment maneuvers.

Figure 11:
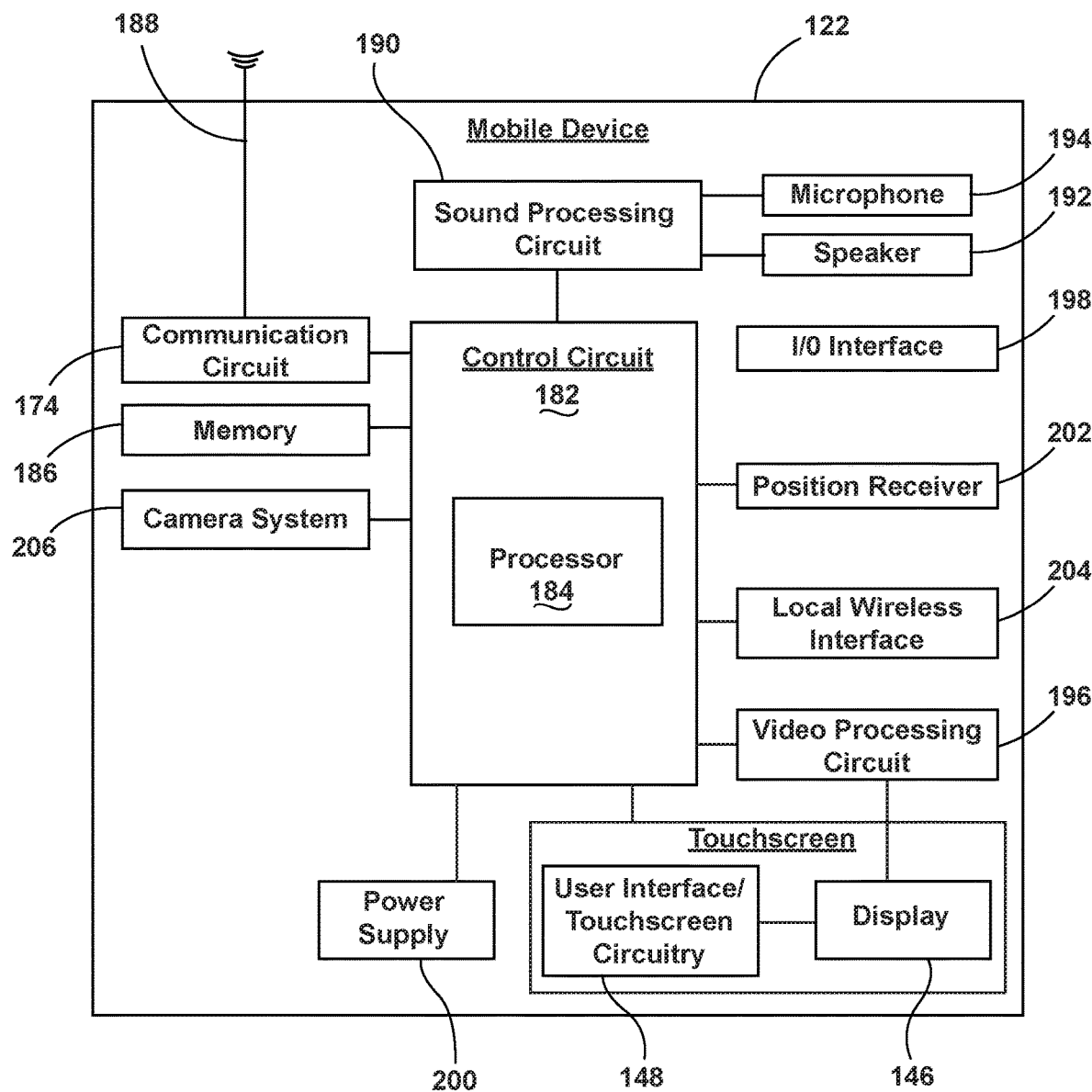
FIG. 11 is a block diagram of the mobile device configured to accept alignment instructions, according to some examples.

Referring to FIG. 11, the mobile device 122 includes a primary control circuit 182 that is configured to control the functions and operations of the mobile device 122. The control circuit 182 may include a processor 184, such as a CPU, microcontroller, or microprocessor. The processor 184 is configured to execute logic stored in a memory 186 in order to carry out various operations of the mobile device 122. The memory 186 may be, for example, one or more of a buffer, a flash memory, a hard drive, a removable media, a volatile memory, a non-volatile memory, or other suitable devices operable to store data in a non-transitory state.

The mobile device 122 may also include an antenna 188 coupled to a wireless communication circuit 174. The communication circuit 174 includes a radio frequency transmitter and receiver for transmitting and receiving signals via the antenna 188. The radio signals may be configured to transmit data and may correspond to various communications protocols. The communication circuit 174 may be configured to operate in a mobile communications system and may be used to send and receive data and/or audiovisual content. The communication circuit 174 may further be operable to communicate with the controller 14 via various wireless protocols.

The mobile device 122 further includes a sound signal processing circuit 190 for processing audio signals transmitted by and received from the communication circuit 174. A speaker 192 and a microphone 194 that enable a user U to listen and audibly communicate via the mobile device 122 are coupled to the sound processing circuit 190. The communication circuit 174 and sound processing circuit 190 are each coupled to the control circuit 182 to carry out overall operation of the mobile device 122. Audio data may be passed from the control circuit 182 to the sound signal processing circuit 190 for playback to the user U. The audio data may include, for example, audio data from an audio file stored in the memory 186 and retrieved by the control circuit 182, or received audio data such as in the form of audio data from a remote server. In some examples, the audio data may correspond to one or more audio instructions describing at least one step of the trailer setup. The sound processing circuit 190 may include any appropriate buffers, decoders, amplifiers, etc.

The touchscreen 144 may be coupled to the control circuit 182 by a video processing circuit 196 that converts video data to a video signal used to drive the display 146. The video processing circuit 196 may include any appropriate buffers, decoders, video data processors, etc. The video data may be generated by the control circuit 182, retrieved from a video file that is stored in the memory 186 (e.g. a coupler alignment application 152 stored in the memory 186), derived from an incoming video data stream received by the communication circuit 174 from the remote server, or obtained by any other suitable method. The mobile device 122 may further include a user interface 154 and/or touch input circuitry 148 in communication with the control circuit 182.

The mobile device 122 may further include one or more I/O interfaces 198. The I/O interfaces 198 may be in the form of typical mobile telephone I/O interfaces and may include one or more electrical connectors. The I/O interfaces 198 may be used to couple the mobile device 122 to a battery charger to charge a battery of a power supply 200 within the mobile device 122. Further, the I/O interfaces 198 may serve to connect the mobile device 122 to the controller 14, a personal computer, or other device via a data cable for the exchange of data. The data exchanged may include image data for identifying at least one characteristic of the trailer 18, a trailer profile, dimensional data corresponding to the trailer 18, and additional alignment data. The mobile device 122 may receive operating power via the I/O interfaces 198 when connected to a power adapter.

The control circuit 182 may comprise one or more timers for carrying out timing functions. The mobile device 122 also may include a position data receiver 202, such as a global positioning system (GPS) receiver. The mobile device 122 also may include a local wireless interface 204, such as an infrared transceiver and/or an RF adaptor (e.g., a Bluetooth adapter), for establishing communication with the controller 14 of the vehicle 12, a computer, or any compatible device. For example, the local wireless interface 204 may operably couple the mobile device 122 to the controller 14 to communicate programming and alignment information for setup of the trailer 18 for utilization with the hitch assist system 10.

The mobile device 122 may further be coupled to a camera system 206. The camera system 206 may be configured to capture at least one image corresponding to a characteristic and/or coded data corresponding to alignment information for the trailer 18 providing for an improved alignment procedure that may improve the ease and accuracy of the alignment process for the hitch assist system 10.

Figure 12:
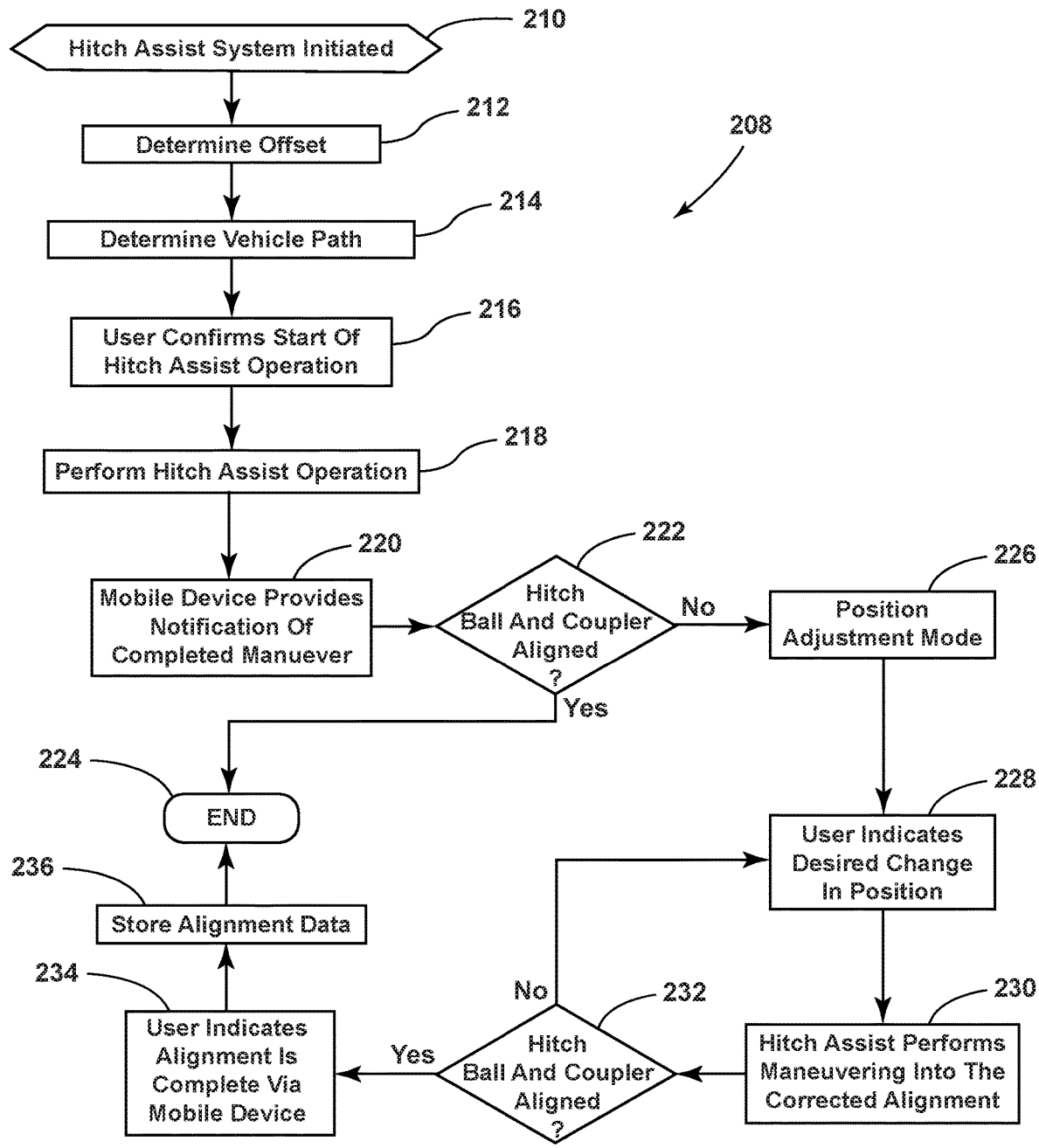
FIG. 12 is a flowchart of an operating routine of the hitch assist system, according to some examples.

Referring to FIG. 12, an operating routine 208 of aligning the hitch assembly 22 with the coupler 16 is shown, according to some examples. In particular, at step 210, the hitch assist system 10 is initiated. Upon initiation of the hitch assist system 10, the hitch assembly specifications are determined, and an offset of the coupler 16 relative to the hitch assembly 22 is determined. Once the offset is determined at step 212, the path derivation routine 128 can be used to determine the vehicle path 20 to align the hitch ball 26 with the coupler 16 at step 214. In this manner, the controller 14 uses the path derivation routine 128 to determine the path 20 to align the hitch ball 26 with the coupler 16 in an overlapping position over hitch ball 26. Once the path 20 has been derived, the hitch assist system 10 can ask the user U to relinquish control of at least the steering wheel 88 of vehicle 12 (and, optionally, the throttle 100 and brake, in various examples of the hitch assist system 10 wherein the controller 14 assumes control of the powertrain control system 98 and the brake control system 96 during execution of the operating routine 130) and confirm the initiation of the hitch assist operation at step 216. When the hitch assist operation has been confirmed by the user U, the controller 14 may begin to move vehicle 12 along the determined path 20 at step 218 The hitch assist system 10 may then control the steering system 80 to maintain the vehicle 12 along the path 20 as either the user U or the controller 14 controls the speed of vehicle 12 using the powertrain control system 98 and the braking control system 96. The vehicle 12 may continue along the vehicle path 20 until the hitch ball 26 is believed to be aligned with the coupler 16.

At step 220, the mobile device 122 may display a message to the user U that the vehicle maneuver has been completed. At step 222, the user U, through use of the user interface 154, may select whether the hitch ball 26 and the coupler 16 are aligned. If the hitch ball 26 and the coupler 16 are aligned, the operating routine 130 ends at step 224. If the hitch ball 26 and the coupler 16 are still not aligned, as defined by the user U, the routine continues to step 226 where an alignment operation is initiated. The alignment operation may be initiated if the user U determines that the hitch ball 26 is not sufficiently aligned with the coupler 16 through one or more touch events on the mobile device 122.

At step 228, the user U utilizes a user interface 154 on the mobile device 122 to define an alignment position by indicating a desired change in position. As provided herein, the user interface 154 may be in any form in which the user U may define the offset 156 and/or correct misalignment of the hitch ball 26 and the coupler 16.

Once the defined misalignment is determined at step 228, the path derivation routine 128 can be used to determine the vehicle path 20 to align the hitch ball 26 with the coupler 16. In this manner, the controller 14 uses the path derivation routine 128 to determine the path 20 to align the hitch ball 26 with the coupler 16 in an overlapping position over hitch ball 26. Once the path 20 has been derived, the hitch assist system 10 performs maneuvering of the vehicle 12 along the vehicle path 20 until the hitch ball 26 reaches the user U defined alignment position at step 230.

At step 232, a subsequent message is provided on the user interface 154 in which the user U confirms whether the hitch ball 26 and the coupler 16 are aligned. If the coupler 16 and the hitch ball 26 are still misaligned, the routine returns to step 228 for further alignment maneuvers. If the hitch ball 26 and the coupler 16 are aligned, the user U indicates alignment is complete through usage of the user interface 154 at step 234. In some examples, at step 236, the hitch assist system 10 may store the alignment data to better align the hitch ball 26 and the coupler 16 in subsequent hitch assist operations. Moreover, the hitch assist system 10 may detect and/or store various vehicle and environmental characteristics to better align the hitch ball 26 and the coupler 16 in future hitch assist operations. For example, the hitch assist system 10 may detect and store trailer properties, GPS coordinates, orientation of the vehicle 12 and/or the trailer 18, type of ground surface the vehicle 12 and/or trailer 18 is disposed on, the lie or incline of the ground surface, etc. and calibrate the hitch assist system 10 for future operations. By storing the difference in position, repeated misalignment issues can be eliminated. The operating routine 130 then ends at step 224.

A variety of advantages may be derived from the use of the present disclosure. For example, use of the disclosed hitch assist system provides a system for further aligning a hitch assembly with a coupler of the trailer. The hitch assist system may store the various user-defined positional changes for further calibration in future hitch assist operations. A user of the hitch assist system may utilize a remote mobile device to define an offset between the hitch assembly and the coupler such that the user may be disposed proximate a rear portion of the vehicle. In some instances, the vehicle may autonomously maneuver to a user-defined alignment position. The hitch assist system provided herein may be manufactured with any or all of the advantages provided herein at lower costs than other developed systems.

According to various examples, a hitch assist system is provided herein. The hitch assist system includes a mobile device remotely disposed from a vehicle and configured to receive a user input for adjusting an alignment position of a hitch assembly of a vehicle. The hitch assist system also includes a controller configured to generate commands for maneuvering the vehicle such that the hitch assembly is moved to an adjusted position at which the hitch assembly is aligned with a coupler of a trailer. Examples of the hitch assist system can include any one or a combination of the following features:

- the mobile device includes a touchscreen display configured to display a view of the hitch assembly and register one or more touch events thereon for adjusting the alignment position of the hitch assembly;
- the touchscreen display is configured to generate a graphical icon having multiple touchpoints for adjusting the alignment position of the hitch assembly;
- the touchpoints allow adjustment of the alignment position in at least one of a lateral direction and a longitudinal direction;
- the graphical icon is configured to display a difference in position between the alignment position of the hitch assembly and the adjusted alignment position of the hitch assembly;
- the touchscreen display is configured to generate an indicator graphically representing the alignment position of the hitch assembly and movable in response to each touch event;
- the touchpoints are graphically represented as arrows and each touch event on a given touchpoint incrementally moves the indicator in a direction specified by the corresponding arrow;
- the controller is configured to determine a difference in position between the alignment position and the adjusted alignment position;
- the controller stores the difference in position to memory and applies the difference in position to future maneuvers of the vehicle toward the trailer; and/or
- the hitch assembly comprises a hitch ball and the coupler comprises a coupler ball socket.

Moreover, a method of correcting misalignment between a hitch assembly of a vehicle and a coupler of a trailer is provided herein. The method includes performing a vehicle maneuver. The method also includes receiving a user input via a mobile device remotely disposed from the vehicle for adjusting an alignment position of the hitch assembly. The method further includes generating commands through a vehicle controller for maneuvering the vehicle such that the hitch assembly is moved to an adjusted alignment position at which the hitch assembly is aligned with the coupler. Examples of the method can include any one or a combination of the following features:

- determining a difference in position between the alignment position of the hitch assembly and the adjusted alignment position of the hitch assembly;
- storing the difference in position to memory; and/or
- applying the difference in position to future maneuvers of the vehicle toward the trailer.

According to some examples, a mobile device communicatively coupled with a vehicle is provided herein. The mobile device includes a touchscreen display configured to display a view of a hitch assembly proximate a coupler of a trailer and register one or more touch events thereon for adjusting an alignment position of the hitch assembly to correct misalignment between the hitch assembly and the coupler. Examples of the hitch assist system can include any one or a combination of the following features:

- the touchscreen display is configured to generate a graphical icon having multiple touchpoints for adjusting the alignment position of the hitch assembly;
- the touchpoints allow adjustment of the alignment position in at least one of a lateral direction and a longitudinal direction;
- the graphical icon is configured to display a difference in position between the alignment position of the hitch assembly and an adjusted alignment position of the hitch assembly;
- the touchscreen display is configured to generate an indicator graphically representing the alignment position of the hitch assembly and movable in response to each touch event; and/or
- the touchpoints are graphically represented as arrows and each touch event on a given touchpoint incrementally moves the indicator in a direction specified by the corresponding arrow.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Examples of the systems, apparatuses, devices, and methods disclosed herein may include or utilize a special-purpose or general-purpose computer including computer hardware, such as, for example, one or more processors and system memory, as discussed herein. Examples within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, examples of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

Examples of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It will be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It will be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A hitch assist system comprising:
   a mobile device remotely disposed from a vehicle and configured to receive a user input for adjusting an alignment position of a hitch assembly of a vehicle; and
   a controller configured to determine a path for the vehicle to move towards an alignment position with a coupler of a trailer and to generate commands to maneuver the vehicle along the determined path, the controller further configured to initiate an alignment operation based on the user input to adjust the alignment position of the hitch assembly with the coupler and to move the vehicle to the adjusted alignment position at which the hitch assembly is aligned with the coupler of the trailer.

2. The hitch assist system of claim 1, wherein the mobile device includes a touchscreen display configured to display a view of the hitch assembly and register one or more touch events thereon for adjusting the alignment position of the hitch assembly.

3. The hitch assist system of claim 2, wherein the touchscreen display is configured to generate a graphical icon having multiple touchpoints for adjusting the alignment position of the hitch assembly.

4. The hitch assist system of claim 3, wherein the touchpoints allow adjustment of the alignment position in at least one of a lateral direction and a longitudinal direction.

5. The hitch assist system of claim 4, wherein the graphical icon is configured to display a difference in position between the alignment position of the hitch assembly and the adjusted alignment position of the hitch assembly.

6. The hitch assist system of claim 3, wherein the touchscreen display is configured to generate an indicator graphically representing the alignment position of the hitch assembly and movable in response to each touch event.

7. The hitch assist system of claim 6, wherein the touchpoints are graphically represented as arrows and each touch event on a given touchpoint incrementally moves the indicator in a direction specified by the corresponding arrow.

8. The hitch assist system of claim 1, wherein the controller is configured to determine a difference in position between the alignment position and the adjusted alignment position.

9. The hitch assist system of claim 8, wherein the controller stores the difference in position to memory to calibrate the system and is configured to apply the difference in position to future maneuvers of the vehicle toward the trailer.

10. The hitch assist system of claim 1, wherein the hitch assembly comprises a hitch ball and the coupler comprises a coupler ball socket.

11. A method of correcting misalignment between a hitch assembly of a vehicle and a coupler of a trailer, comprising the steps of:
    determining a path to move the vehicle to align the hitch assembly with the coupler;
    performing a vehicle maneuver to move the vehicle along the determined path towards an initial alignment position of the hitch assembly with the coupler;
    receiving a user input via a mobile device remotely disposed from the vehicle for adjusting the alignment position of the hitch assembly with the coupler; and
    generating commands through a vehicle controller for maneuvering the vehicle such that the hitch assembly is moved from the initial alignment position to the adjusted alignment position at which the hitch assembly is aligned with the coupler.

12. The method of claim 11, further comprising the step of:
    determining a difference in position between the alignment position of the hitch assembly and the adjusted alignment position of the hitch assembly.

13. The method of claim 12, further comprising the step of:
    storing the difference in position to memory to calibrate the controller.

14. The method of claim 13, further comprising the steps of:
    performing another vehicle maneuver of the vehicle towards the trailer; and
    applying the difference in position to another vehicle maneuver.

* * * * *